US007112134B1

(12) United States Patent
Erlichman

(10) Patent No.: US 7,112,134 B1
(45) Date of Patent: Sep. 26, 2006

(54) METHOD AND SYSTEM FOR PHOTOGRAPHIC GAMING

(75) Inventor: Martin Erlichman, Los Angeles, CA (US)

(73) Assignee: Pixel Puzzles, Inc., Los Angeles, CA (US)

( * ) Notice: Subject to any disclaimer, the term of this patent is extended or adjusted under 35 U.S.C. 154(b) by 213 days.

(21) Appl. No.: 10/155,820

(22) Filed: May 24, 2002

Related U.S. Application Data

(60) Provisional application No. 60/367,478, filed on Mar. 26, 2002.

(51) Int. Cl.
*A63F 13/00* (2006.01)

(52) U.S. Cl. .......................................... 463/16; 463/30

(58) Field of Classification Search ............ 463/16–22, 463/25–32, 42–44, 9–13; 345/726, 839; 273/242
See application file for complete search history.

(56) References Cited

U.S. PATENT DOCUMENTS 2,554,942 A * 5/1951 Dobrowsky ................. 273/155
4,521,014 A * 6/1985 Sitrick ......................... 463/31
4,666,160 A * 5/1987 Hamilton .................... 273/242
4,710,873 A * 12/1987 Breslow et al. ............... 463/31
5,545,088 A * 8/1996 Kravitz et al. ................ 463/40
5,553,864 A * 9/1996 Sitrick ......................... 463/31
5,564,700 A * 10/1996 Celona ........................ 463/27
5,595,389 A * 1/1997 Parulski et al. ............... 463/31
5,830,065 A * 11/1998 Sitrick ......................... 463/31
5,851,148 A * 12/1998 Brune et al. .................. 463/25
5,941,774 A * 8/1999 Takemoto et al. ............ 463/31
6,039,648 A * 3/2000 Guinn et al. .................. 463/16
6,056,640 A * 5/2000 Schaaij .......................... 463/4
6,113,098 A * 9/2000 Adams ................... 273/143 R
6,135,884 A * 10/2000 Hedrick et al. ............... 463/20
6,139,432 A * 10/2000 Watanabe et al. ............. 463/31
6,285,381 B1 * 9/2001 Sawano et al. ............. 345/726
6,287,197 B1 * 9/2001 Dickinson et al. ............ 463/31
6,302,790 B1 * 10/2001 Brossard ...................... 463/20
6,350,199 B1 * 2/2002 Williams et al. .............. 463/16
6,358,147 B1 * 3/2002 Jaffe et al. .................... 463/20
6,375,570 B1 * 4/2002 Poole .......................... 463/31

(Continued)

FOREIGN PATENT DOCUMENTS

JP 2004097628 A * 4/2004

OTHER PUBLICATIONS

"Silicon Gaming, Inc. and MGM Grand, Inc. Launch Next Generation Gaming Experience: Family Feud Slots". Jun. 1, 2000: Las Vegas. http://www.lasvegastalk.com/press/show-pr.php3?idx=205.

*Primary Examiner*—Scott Jones
(74) *Attorney, Agent, or Firm*—Innovation Partners; Charles E. Gotlieb

(57) ABSTRACT

A system or method receives digital image sets from a player of a game in which money is wagered and prizes of more than a nominal value may be won. A player may leave the digital image sets he supplied with the system and method for use in the games of other players and that player may win prizes or entries in a contest based on the use of his or her image in other player's games. An advertiser may supply digital image sets corresponding to a promotion for use in a player's game, and the player can win prizes or entries in a contest based on the digital image sets displayed in the player's game.

21 Claims, 6 Drawing Sheets

U.S. PATENT DOCUMENTS

| | | | | |
|---|---|---|---|---|
| 6,425,825 | B1 * | 7/2002 | Sitrick | 463/31 |
| 6,435,969 | B1 * | 8/2002 | Tanaka et al. | 463/44 |
| 6,540,610 | B1 * | 4/2003 | Chatani | 463/31 |
| 6,540,615 | B1 * | 4/2003 | Tanaka et al. | 463/44 |
| 6,677,967 | B1 * | 1/2004 | Sawano et al. | 345/839 |
| 6,719,630 | B1 * | 4/2004 | Seelig et al. | 463/16 |
| 6,802,777 | B1 * | 10/2004 | Seelig et al. | 463/20 |
| 6,863,608 | B1 * | 3/2005 | LeMay et al. | 463/24 |
| 2002/0173355 | A1 * | 11/2002 | Walker et al. | 463/25 |
| 2002/0173358 | A1 * | 11/2002 | Yoshida | 463/42 |
| 2003/0022710 | A1 * | 1/2003 | DeMar et al. | 463/16 |
| 2003/0199295 | A1 * | 10/2003 | Vancura | 463/16 |

* cited by examiner

METHOD AND SYSTEM FOR PHOTOGRAPHIC GAMING

RELATED APPLICATION

This application claims the benefit of U.S. Provisional Patent Application Ser. No. 60/367,478 entitled, "Photo-slot machine" filed by Martin Erlichman on Mar. 26, 2002 and is hereby incorporated by reference in its entirety.

FIELD OF THE INVENTION

The present invention is related to games and more specifically to games from which a monetary or other award may be played to a player.

BACKGROUND OF THE INVENTION

Slot machines, video poker machines and other conventional gaming machines are games of skill or chance which utilize a display of one or more images to inform the player or players the identity of each playing piece. Traditional images may be conventional playing card faces, conventional slot machine images (such as cherries, bar, orange, etc.) or other images.

Conventional slot machines include computer systems, with software programmed to play the game and images recorded in a library that are displayed on a conventional computer display before and during the game. The images may be still photographs or video clips.

Some patents describe the library of images used in slot machines or other gaming machines. U.S. Pat. No. 6,302,790 describes a library of images of famous people displayed on a screen during the game. U.S. Pat. No. 4,666,160 describes images imprinted on playing pieces used to play the game. U.S. Pat. No. 6,358,147 describes a library of images of aliens displayed on the screen during a game.

The use of these libraries that deviate from the traditional images can provide an interesting variation on conventional games. Players to whom the images appeal can find such games to be more interesting than the generic libraries of images offered by conventional games. For example, a fan of Lucille Ball will find images from the "I Love Lucy Show" far more interesting than cherries, bars and oranges displayed on a slot machine. Such a player may play such a game more than the player might if the images were generic images. A casino offering games with such images will appeal to such players more than a casino that does not, increasing the business of the casino offering such games. Furthermore, a player is more likely to return to a casino offering games with images that appeal to that player, such loyalty also increasing the business of the casino.

However, libraries of images all suffer from the same drawback: the images in the library will not be meaningful to every player in a casino. Because players in a casino may play games with images that are meaningful to that player, the use of fixed libraries of images can force the player to either search out a game displaying meaningful images, taking time away from the time the player would spend playing the game, or play games with more generic images, making the player less likely to return to that casino. In each case, the player may play less than he would if any machine selected had images meaningful to the player.

Another problem with libraries of images is that, although the library of images may appeal to a player more than traditional images, the available images in the machines at a casino may not be the most meaningful images for any particular player. For example, even fans of Lucille Ball may find images that do not contain Lucille Ball to be more meaningful to that player: a player may enjoy Lucille Ball, but find Barbara Streisand to be even more appealing. Thus, although the images of Lucille Ball can cause the player to play more than the player would with other images, if the most appealing images of Barbara Streisand were available, the player might play the game even more. Thus, fixed libraries of images can cause casinos to earn less money than they otherwise might.

Another problem with libraries of images is that the images that are part of the game may not be taken only a short time before playing the game. If a group of friends shows up in Las Vegas, it would be fun to use an image of the group of friends as an image in the game. No conventional game in which monetary prizes are awarded to a player includes images taken of the player for use in the game.

Slot machines, video poker and other games played in casinos suffer from another drawback: the player only wins as long as the player plays the game. There is no opportunity to win during times that players do not play the game. No conventional game in which players are awarded monetary prizes allows players to win after they have stopped playing the game.

What is needed is a system and method that can provide images most meaningful to a player to be made a part of a game in which money is paid as a prize, allow spontaneous images to be added to such a game, and allow players to win prizes even after they stop playing the game.

Another problem with conventional gaming machines such as slot machines, video poker, and other games for which a monetary prize is provided is the fact that the images that make up the game and are provided to the player do not generate revenue to any party responsible for providing the images.

What is needed is a system and method that can assist a party providing images to players of a game for which a monetary or other prize is paid to obtain revenue resulting from the display of those images.

SUMMARY OF INVENTION

A system and method allows players to supply one or more images for use in a game, or to take one or more images of themselves or others, and then play a conventional game using those images, for which money is paid as a prize, such as an otherwise conventional casino game. The system and method allows players to optionally designate their images for use in other players' games. If that prior player's image is a part of another player's game, and if the other player is awarded a prize such as a monetary prize, an award such as a point award later redeemable, is awarded to any other prior player who supplied an image also used in the game.

In another embodiment, the system and method allows revenue to be obtained from the display of one or more images in a slot machine, video poker game or other game for which a monetary or other prize is paid by tracking the number of times the image is displayed, ensuring that the one or more images are displayed a minimum number of times, or both.

DETAILED DESCRIPTION OF A PREFERRED EMBODIMENT

Figure 1:
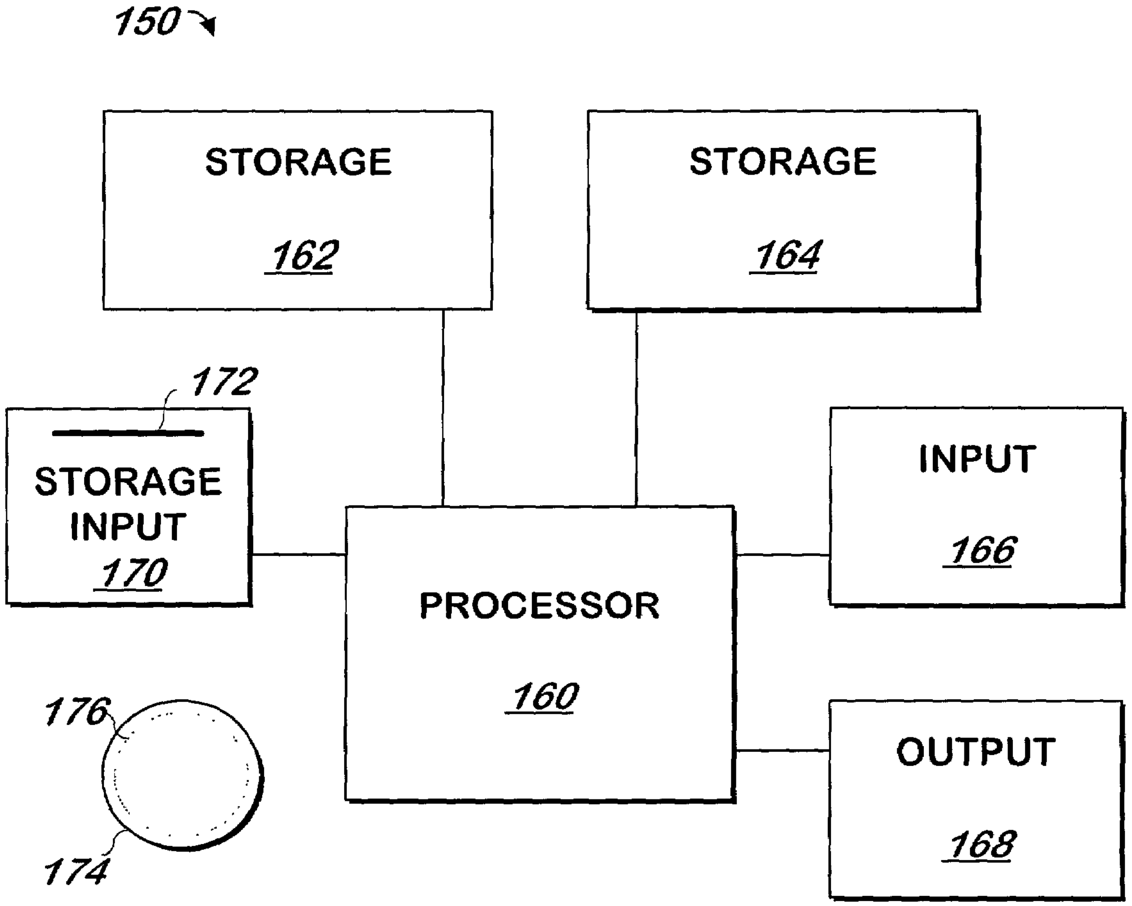
FIG. 1 (PRIOR ART)
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond Wash. or running the FreeBSD operating system commercially available from the website freebsd.org, or a Macintosh computer system running the MacOS or OpenStep operating system commercially available from Apple Computer Corporation of Cupertino, Calif. and the Netscape browser commercially available from Netscape Computer Corporation of Mountain View, Calif. although other systems may be used.

Figure 2A:
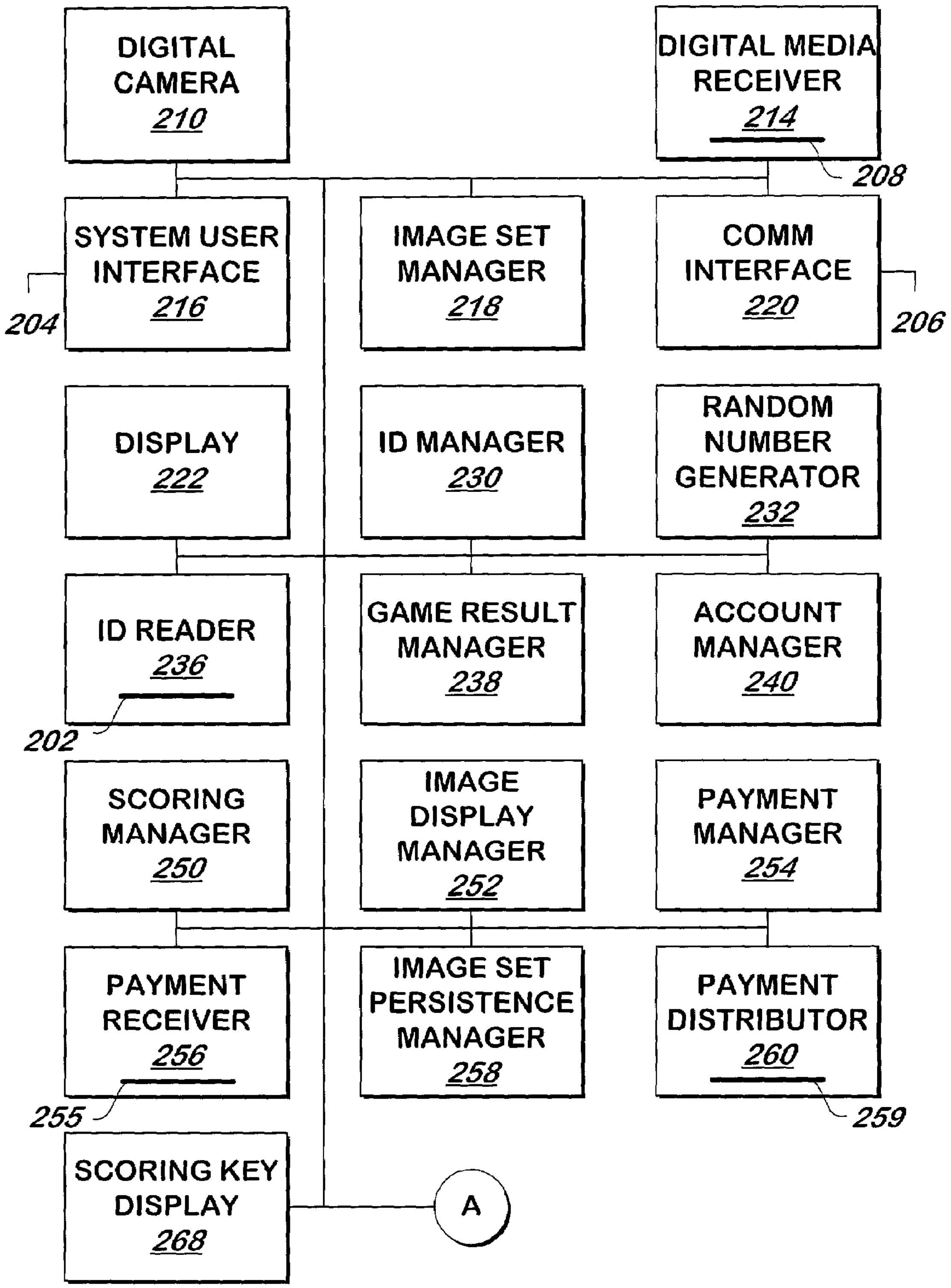
FIG. 2, consisting of FIGS. 2A and 2B, is a block schematic diagram of photographic gaming machine according to one embodiment of the present invention.
FIG. 2C is a block schematic diagram of a kiosk 290 according to one embodiment of the present invention.
Figure 2B:
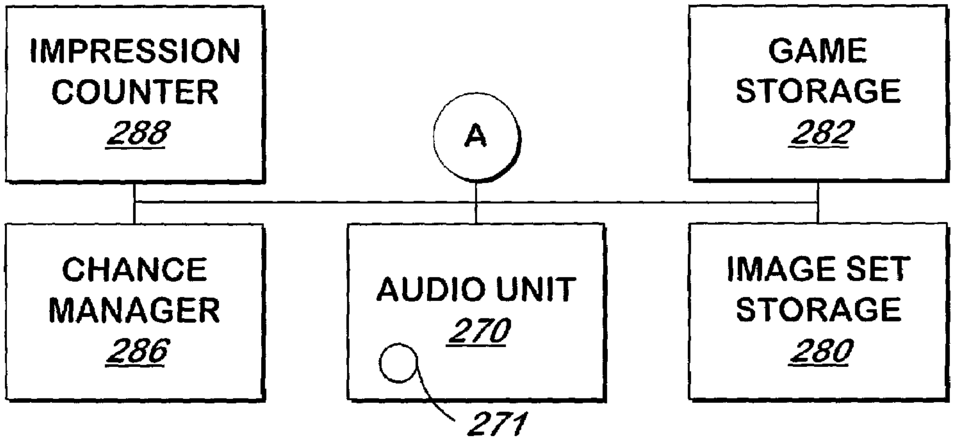
Figure 2:
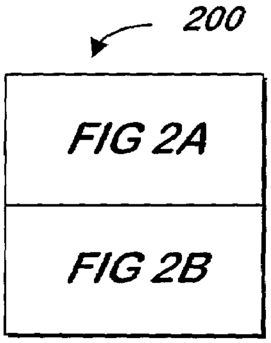

Referring now to FIG. 2, a photographic gaming system 200 is shown according to one embodiment of the present invention. System 200 is a gaming device for playing a game for which a monetary or other prize of greater than nominal value, is paid. The game may operate in a manner similar to a conventional video slot machine, video poker machine or any other conventional casino game.

Three embodiments of the present invention are disclosed. In one, the player supplies an image that is used in the game, for example, as an image on a reel of a slot machine or as a portion of a playing card. The image may be of the player himself, parties related to the player such as the player's grandchildren or other relatives, or other images that the player either provides or selects. In another embodiment, the image is supplied by, or includes a photographic image of, or supplied by, another player who will gain something of value or a chance at something of value if a different player wins the game while the image supplied by or of the other player is displayed.

In still another embodiment of the present invention, the image or images used in the game may be supplied by a party other than the player. This third party provides a payment for the display of the image in the game and the system and method either counts the number of times an image set is displayed, ensures that an image set is displayed a minimum number of times, or both.

In one embodiment, a player wishing to provide images for use by system 200 may first register with a system administrator for system 200. The system administrator generates a player identifier, and provides the player with an identification object, such as a magnetic-stripe card, that can be used to access system 200. In one embodiment, a credit card number may be associated with the player identifier to allow the credit card to be used as the identification object. In one embodiment, the identification object operates in a manner similar to conventional casino player tracking cards, which track the cumulative amount of money wagered, and other statistics about a player as they play conventional casino games.

Figure 3:
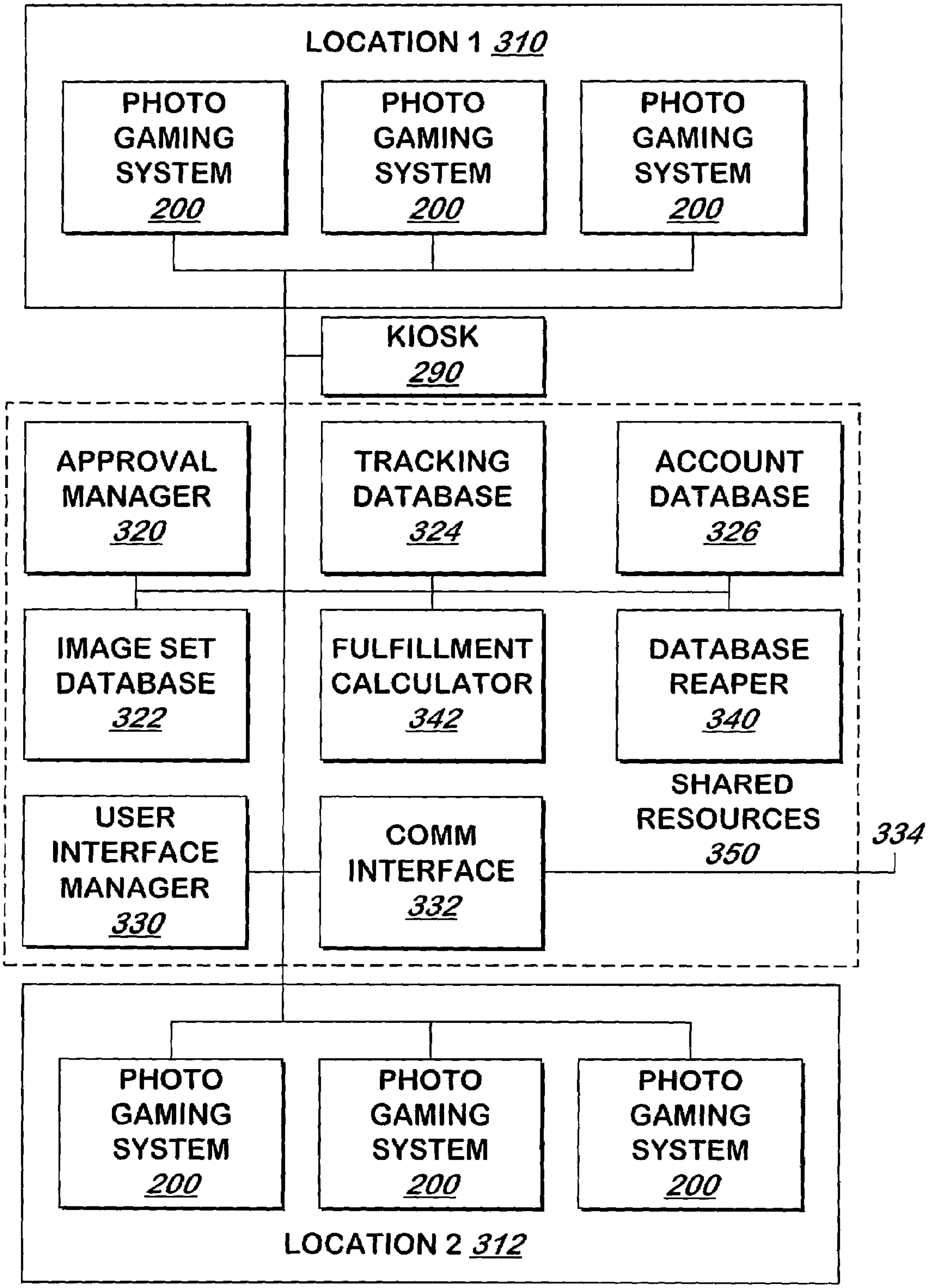
FIG. 3 is a block schematic diagram illustrating several interconnected photographic gaming machines and kiosk with shared resources according to one embodiment of the present invention.

In one embodiment, system 200 is connected to a set of shared resources along with other systems 200 to allow registration and other information described herein to be shared by multiple systems 200. FIG. 3 is a block schematic diagram illustrating several interconnected photographic gaming systems 200, each coupled to shared resources 350 according to one embodiment of the present invention. Referring now to FIG. 3, a system administrator communicates with the shared resources 350 using communication interface 332. Communication interface 332 contains one or more conventional communication interface such as a conventional TCP/IP-compatible communication interface coupled to the Internet via input/output 334, a conventional Ethernet communication interface coupled to a local area network via input/output 334, or a conventional keyboard/mouse/monitor driver coupled via input/output 334 to a conventional keyboard/mouse/monitor (not shown), which may in turn be coupled to a conventional computer system. Communication interface 332 also communicates with systems 200 and kiosk 290, some of which are shown in the Figure. User interface manager 330 provides a user interface to the system administrator and communicates with other elements of shared resources 350 and optionally, any of the systems 200 as described herein. Unless otherwise noted, all input and output between the shared resources 350 and the system administrator is provided by input/output 334 of communication interface 332 and user interface manager 330. In one embodiment, communication interface 332 may simultaneously support several system administrators.

To register a player, the system administrator uses user interface manager 330 to add to account database 326 an account record, containing information about the player and the player identifier. The system administrator may add to the account record in account database 326 an account balance in an amount of funds collected from, or advanced to, the player.

Referring now to FIGS. 2 and 3, to interact with a system 200, a player provides identification to system 200 in a conventional manner, for example by inserting or swiping an identification object furnished to the player by the administrator of system 200. The identification object may be a magnetic strip card, although other techniques, such as biometrics, or a smart card, may be used. ID reader 236 receives the identification object via input 202 reads the player identifier and sends the player identifier to ID manager 230. In one embodiment, ID reader 236 is a conventional input device, such as a magnetic card reader, that decodes the identification information provided by the player on an identification card which may contain a magnetic strip, when the card is inserted to input 202, which may be a conventional magnetic card slot.

ID manager 230 receives and authenticates the player identifier. In one embodiment, ID manager 230 first authenticates the player identifier using parity, checksums, a cyclic redundancy check, or other self-authenticating string provided as part of the player identifier. If ID manager authenticates the player in this fashion, in one embodiment, ID manager 230 builds a query containing the player identifier received from ID reader 236, sends via communication interface 220 the query to account database 326, which may include a conventional authentication server, and receives a reply indicating whether or not the player identifier is in the database. Other authentication techniques such as conventional biometrics and the like may also be used by ID manager 230 to authenticate the player.

Unless otherwise specified, all communication between system 200 and shared resources is made via input/output 206 of communication interface 220 which is coupled to a network such as the Internet, a local area network, or a wide area network or any combination of these. Communication interface 220 includes a conventional communication interface that supports Ethernet, TCP/IP, or other conventional communication protocols.

Once ID manager 230 has authenticated the player, ID manager 230 provides a player identifier (either received from the identification object or from account database 326 via communication interface 220), stores the player identifier in storage within ID manager 230, and signals user interface 216. In one embodiment, ID manager 230 requests and receives a sign-on timestamp from a timer (not shown) and stores the sign-on timestamp along with the player identifier as described below.

In one embodiment, the player provides a digital image set to system 200 for use as described herein. The digital image set may be used in the game played by the player or may be used in other games that are not played by the player as described in more detail below. The player may provide the digital image set using any conventional means, for example, using digital still or video camera 210 that is part of system 200, or by supplying the image set using a portable digital media such as a floppy disk, or via a network, such as the Internet. As used herein, a digital image set may be one or more still images such as photos from a digital camera or video recorder, one or more printed photos scanned using a scanner, or a series of images from a video recorder. In other embodiments, a digital image set is anything supplied by a player for display into a game, and may include a Web site address, a phrase, a home phone number, a signature, an address, a social security number or anything other than a name or the name of the player, and in another embodiment, a digital image set includes the name of the player. Thus, although in one embodiment, digital image sets may be one or more photographic images, in another embodiment, information other than one or more photographic image may be used as a digital image set, as long as it can be displayed as a part of a game. Thus, "digital image set" is defined in this manner for use herein.

As used herein, to supply a digital image set, a player may provide the digital image set itself, or may supply the subject matter of the digital image set, which may be converted into a digital image set, for example using a camera to convert the image of a player into a digital image set, or a graphics generator to convert text into a digital image set. As used herein, receiving the digital image set from the player may thus involve receiving the subject matter of the digital image set from the player, and not the ultimate digital image set that is displayed as part of the game as described below.

In one embodiment, the player may provide a digital image set using system 200, although in other embodiments, the player provides the digital image set directly to the shared resources 350. To provide a digital image set to the system 200, the player signals system user interface 216. System user interface 216 receives the signal via input/output 204, and prompts the player via display 222 to select the method of providing a digital image. System user interface 216 is a conventional user interface that provides for interaction between the player and system 200 by means of display 222 (a conventional display, such as a CRT or LCD display), and a user input device, such as a set of buttons, or a light-pen, and may be connected to such user input device via input/output 204. In one embodiment, all communication between the player and system 200 occurs through system user interface 216. In one embodiment, display 222 includes other conventional input and output devices, such as a touch screen and a speaker. Input may be received from the player via display 222 by means of the touch screen, in addition to, or in place of, using buttons or a keyboard or other conventional input means coupled to input 204.

Once prompted, the player chooses the method of providing the digital image set by means of the user input device. System user interface 216 receives the player's choice, examines the choice, and signals a component of system 200 depending on the received choice. If the player chooses to provide a digital image set by having a photograph or video clip taken, then system user interface 216 signals digital camera 210 to take one or more photos of the player after an optional waiting period.

Digital camera 210 is a conventional digital camera, capable of capturing still pictures, video clips, or both. Digital camera 210 captures one or more still photographs or video clips of the player, and sends the image set to image set manager 218, which receives the image set, requests and receives the player identifier from ID manager 230, and sends the image and the associated player identifier to approval manager 320 via communication interface 220.

The player may choose to provide a digital image set via digital media, such as a floppy disk or a memory stick. If the player chooses to provide a digital image set via digital media, then system user interface 216 signals digital media receiver 214 and prompts the player to insert the digital media.

Digital media receiver 214 is a conventional digital media receiver such as a floppy drive, memory interface or a USB port. Digital media receiver 214 receives the digital image set via input 208 and sends the digital image set to image set manager 218, which receives the image and sends the image and the associated player identifier to approval manager 320 via communication interface 220.

Figure 2C:
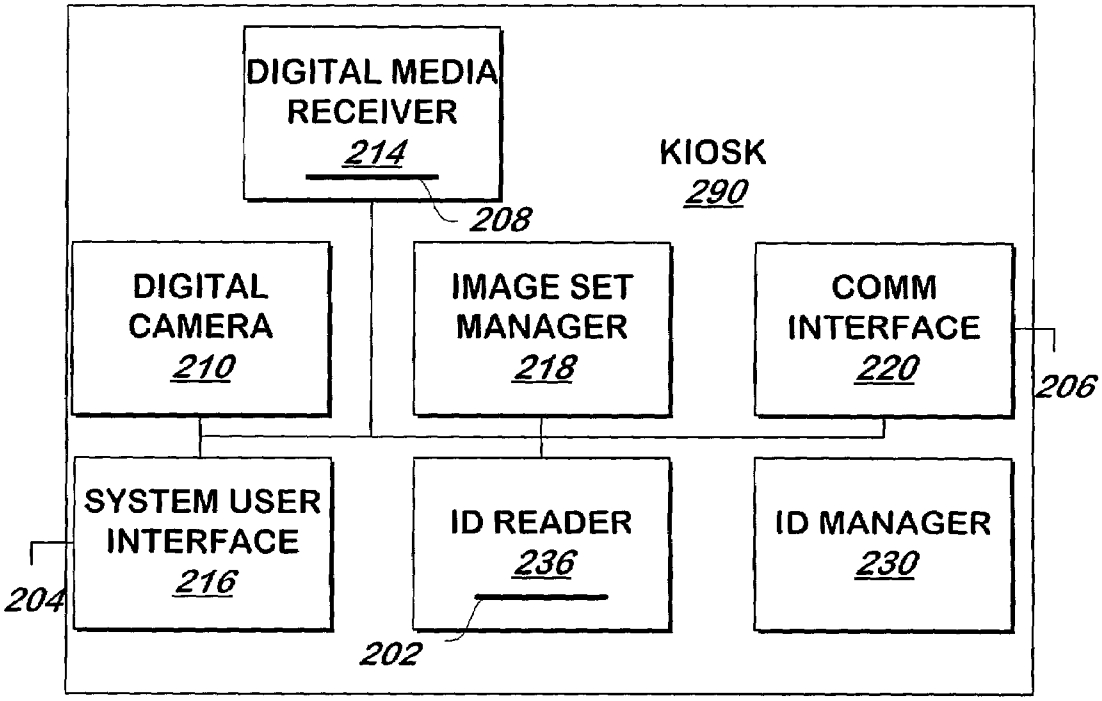

In one embodiment, digital camera 210, digital media receiver 214 or both are located in, near, or around the same cabinet as the other system 200 components used to play the game, although in another embodiment digital camera 210 is located elsewhere from where the game is played, for example in a kiosk, that contains its own system user interface 216, digital camera 210, digital media receiver 214, image set manager 218, digital media receiver 214 and communication interface 220 and operates as if those components were part of a system 200 as described herein. One embodiment of a kiosk 290 is shown in FIG. 2C. The kiosk is coupled via communication interface 220 to communication interface 332 of the shared resources, as shown in FIG. 3. Although one kiosk 290 and six photographic gaming systems 200 are illustrated in the Figure, any number of these in any ratio may be used.

The player may choose to provide a digital image set via a network, such as the Internet. The player may send a digital image and a player identifier via e-mail, FTP, or other conventional electronic transport mechanism. The digital image set and player identifier is received by communication interface 332 which is forwarded to approval manager 320 as described below.

In one embodiment, several instances of system 200 may be connected to various shared resources, although in other embodiments resources described as shared are located with each system 200. FIG. 3 is a block schematic diagram illustrating several interconnected photographic gaming machines with shared resources according to one embodiment of the present invention.

Referring now to FIGS. 2 and 3, either image set manager 218 sends the digital image set and a player identifier to approval manager 320 via communication interface 220 and communication interface 332 or the player sends the digital image set via the internet and communication interface 332. Approval manager 320 receives the image and player identifier, stores the image and the player identifier in image set database 322, and marks the image set as not having been approved. In one embodiment, images marked as not having been approved are not used in any game.

A system administrator may indicate to user interface manager 330 that he wishes to view images that are not approved. User interface manager 330 signals approval manager 320, which retrieves from image set database 322 the digital image sets that have not yet been approved, and displays the unapproved images for approval by a system administrator using a conventional user interface contained within approval manager 320, and a conventional display screen. In one embodiment, multiple images are displayed at a time, and may be approved at once to allow for faster approval.

For all images approved by the system administrator, approval manager 320 marks the image as approved in image set database. Images not approved may be marked for return to the player and/or subsequent deletion from image set database 322. Approved images are then available for use in a game as described herein.

In one embodiment, systems 200 and kiosks 290 may be coupled to shared resources 250 from multiple properties, which may include different casinos owned by the same entity or even different casinos owned by different entities. In FIG. 3, location 1 310 may be inside one casino and location 2 312 may be inside a second casino, which each casino being remotely located from one another or even owned by different entities. Although only two locations are shown in the Figure, any number of locations may be coupled to the shared resources 350.

In one embodiment, each location may have its own shared resources, but the image set database 322 may be shared across multiple locations. In such embodiment, image set database 322 may be centrally located or may be a distributed database, with the image set database 322 used for various locations 310, 312 treated as if it is a single database. The sharing of an image set database can assist in the embodiment in which photos other than photos supplied by, or taken of, the player are used, as described in more detail below. It can also allow a player to use at one location images supplied at a different location.

In one embodiment, when the player wishes to play a game, if the player has not already done so, the player may identify himself or herself to a system 200 as described above. When the player so identifies himself or herself to a system, system user interface 216 provides the player identifier to image set manager 218, which downloads into image set storage 280 one or more of the approved digital image sets from image set database 322 by retrieving one or more digital images corresponding to the player identifier in image set database 322. If there is more than one digital image set for a player, in one embodiment, all digital image sets are downloaded, and in another embodiment, the most recent digital image set is downloaded, and in still another embodiment, a digital image set is selected at random by image set database 322 and the selected digital image set is downloaded.

For each digital image set received as described above, image set manager 218 creates an image object consisting of the digital image set, an image icon representing the image set, and the player identifier, and stores the image object in image set storage 280. In one embodiment the image icon is derived from one or more of the images in the digital image set, for example by reducing the size of the image. In another embodiment, the image icon is a graphic, such as a representation of a generic photograph or portrait. The image icon is created in such a way that it can be rendered in less screen real estate than the image. In the embodiment in which multiple image sets are downloaded for a player, image set manager 218 may signal user interface manager 216 when the image sets have been downloaded and image objects created for all of the image sets. In such embodiment, system user interface 216 displays the image icons from each of the image sets and allows the player to chose which image set to use for the game. That image set will be used in the game and the other image sets are marked as inactive and may be stored in image set storage 280 for use in a subsequent game, or deleted from image set storage 280, by image set manager 218.

In one embodiment, between games the player may indicate to system user interface 218 that he wishes to change images. In this event, system user interface 218 signals image set manager 218 to repeat the process of requesting and receiving image sets from image set database 322 as described above, or to request digital image sets that have been received since the last request was made, which image set manager 218 performs by timestamping each such request. This allows newly approved digital image sets to be made available to the player. In one embodiment, if no digital image sets for the player are stored in image set storage 280, image set manager 218 periodically requests digital image sets for the player as described above without requiring the player to request the digital image set, so that newly approved digital image sets may be incorporated into the next game played by the player on a system 200.

Once the player-provided image has been received, and optionally selected, image set manager 218 substitutes, or otherwise incorporates, the player-provided image for a part of or all of one or more of the standard images on the virtual reels. A virtual reel is a set of images that correspond to the standard images on conventional slot machine reels, or correspond to other sequences such as cards used for video poker. Standard images are digital images that correspond to the conventional images in a game, such as images of cherries, oranges, bars, etc. in a slot machine, faces of cards in a card game or other conventional images, and are stored along with associated image icons that may be used to represent the image in a smaller space in a list in image set 280.

A slot machine game will be used as a representative embodiment of a game that may be played using the present invention, however, the present invention may be used to play any conventional game in which a prize of greater than nominal value is paid to a player upon the occurrence of a certain event corresponding to images displayed, such as images displayed corresponding to a straight flush in a video poker game.

In the embodiment in which the game is a slot machine, image set manager 218 maintains a reel table in game storage 282. The reel table consists of one column for each virtual reel, and one row for each stop on a virtual reel (for example, each virtual reel may contain the same number of stops). As used herein, a "stop" is a portion of a virtual reel, which may contain an image set, where the virtual reel may stop, for example, at game end. In one embodiment, the reel table contains twenty rows. In one embodiment, the reel table contains three columns. Each reel table cell contains a pointer to the location of an image object within image set storage 280 for that stop on that reel, although the image within the object may be blank, for example a solid the same color as the background, or a clear GIF. As described below, when a virtual reel is displayed, the images pointed to by the cells in the virtual reel are displayed.

To substitute the player-provided digital image set for a portion or all of a standard image, or to incorporate the player provided digital image set into at least a portion of a standard image, image set manager 218 chooses a standard image to be replaced from the list of standard image objects in image set storage 280, and replaces in the reel table in game storage 282 all references to the chosen standard image with references to the player-provided image. If the player-supplied image is to be substituted for a portion of the standard image or incorporated into it, image set manager 218 performs the substitution or incorporation using the standard image and the player supplied digital image set and conventional digital photographic techniques, and stores the result in the player supplied digital image set in image set storage 280. In one embodiment, one image is incorporated into another if a portion of each image appears in the result, regardless of the technique used or appearance of the result.

To choose a standard image to use for the substitution or incorporation described above, in one embodiment, image set manager 218 chooses a standard image at random. In another embodiment, image set manager 218 always chooses one particular standard image. In still another embodiment, system user interface 216 allows the player to choose which standard image is to be used for the substitution or incorporation with the player-provided image and provides an identifier of the chosen standard image to image set manager 218, which performs the substitution or incorporation as described above.

To allow the player to choose a standard image to be replaced, image set manager 218 provides a set of icons corresponding to the standard images from image set storage 280 on display 222 via system user interface 216, and prompts the player to choose a standard image to be replaced. In one embodiment, not all standard images may be replaceable by the player. The player uses system user interface 216 to choose a standard image from the displayed set of standard images, and image set manager 218 receives the choice via system user interface 216. Image set manager 218 uses the choice to identify the chosen standard image object, and uses the standard image set corresponding to the chosen standard image object as the standard image to use for the substitution or incorporation as described above.

Image set manager 218 uses the digital image set to be used in place of the standard image to build an icon, and updates the scoring table with the icon of the digital image set to be used in place of the standard image. The scoring table, in game storage 282, contains one entry for each image combination that results in a non-zero payout (a "winning combination"). Each scoring table entry contains one item for each virtual reel, and a payout amount. The payout amount is the amount to be awarded should the corresponding combination of images occur, and may be denominated in credits, described below, and may contain an indication of a non-cash award or prize, either instead of or in addition to a cash prize. Each scoring table entry item contains either a pointer to a digital image set, or a value that indicates a wildcard (i.e. any image corresponds to the item) and also contains an icon representing the digital image set or wildcard. The scoring table is sorted in descending order by payout amount, so that the entry containing the largest payout amount is first, and the entry containing the smallest payout amount is last.

To update the scoring table in game storage 282, image set manager 218 scans each item in each scoring table entry, comparing the digital image set pointers within the scanned items to the pointer to the chosen standard image object for which the player supplied image was substituted, at least in part, or otherwise incorporated. When the pointer within the scanned item matches the pointer to the chosen standard image, image set manager 218 replaces the pointer within the scanned item with a pointer to the player-provided image object, which may have been altered using the standard image such image will be replacing in the game as described above.

After image set manager 218 has updated the scoring table with the pointer to the image object corresponding to the player-provided image, image set manager 218 signals system user interface 216, which retrieves the scoring table in game storage 282, formats the scoring table and displays it via a scoring key area of display 222. To format the scoring table, system user interface 216 uses the image icons from the image objects referred to by the image object pointers. Scoring key area of display 222 is an area of display 222 used to show the payouts for the various winning combinations.

The game is played by wagering an amount credited to the player's account, or by wagering an amount credited to a machine if the player does not provide an identification object. In one embodiment, when the player provides an identification object, system user interface 216 signals account manager 240, which retrieves from the account database 326 any amount of funds credited to the player's account. To add credits to a player's account or to the amount credited to the machine, the player provides payment. In one embodiment the player provides payment in the form of coins, tokens, chips, a credit card or bills or any other form of payment. Payment is received by payment receiver 256 via input slot 255, which verifies the validity of the payment and sends the payment amount to payment manager 254. Payment receiver 256 may be a conventional payment receiver that can determine an amount of cash supplied to it or can read a credit, debit or smart card and charge a payment to a corresponding account.

Payment manager 254 receives the payment amount and provides it to account manager 240, which adds it to the current amount of funds credited to the player or the machine, stores the total amount, and provides it to system user interface 216, which displays the amount on the display 222.

In one embodiment, account manager 240 converts the payment amount into credits when providing for display the amount credited to the player or the machine. A credit, as used herein, is the minimum amount required to operate system 200. For example, one credit may be twenty five cents (a "quarter slot") or one dollar (a "dollar slot"). Account manager 240 sends the amount in credits to system user interface 216, which receives the total credit amount and displays it on display 222.

Once the player has provided payment, the player uses system user interface 216 to select an amount to wager. In one embodiment, the player is allowed to wager more than one credit with one play and may optionally identify how the more than one credit is to be used. In such embodiment, the payouts for each combination of images varies directly with the amount of the wager and how the credits are specified to be used. The wager amount and instructions as to how the amount is to be used are received by system user interface 216. System user interface 216 sends the wager amount to account manager 240 and sends the wager amount and instructions as to how the wager amount is to be used to scoring manager 250.

Once the player has wagered, the player may start the game. The player uses system user interface 216 to start the game. System user interface 216 signals game result manager 238, account manager 240 and image display manager 252. Account manager 240 subtracts the wager amount from the total credit amount for the player or the machine it stores and signals system user interface 216 to re-display the total credit amount as described above.

In one embodiment, game result manager 238 determines the next move in the game. Although the present invention applies to any form of game in which a prize of more than nominal value is paid, for example purposes, the game will be considered to be a slot machine. In the case of a slot machine, the first move is the only move, though for other types of games, such as video poker, there may be multiple moves.

Image display manager 252 displays images of movement, for example in the manner of a conventional slot machine. For each virtual reel, image display manager 252 retrieves the image pointers from the cells of the reel table in game storage 282 corresponding to that virtual reel, and presents animated, rotating reels on display 222 with the retrieved images appearing to pass by on the portion of each reel viewable by the player.

To make the animation more realistic, image display manager 252 displays the images from each reel table cell in ascending (or in one embodiment, descending) order, starting with the image from the cell corresponding to the reel index for each virtual reel on the previous game operation. For the purposes of ascending order, the image from a reel table cell in row zero of a particular column is considered to follow the image from a reel table cell in the last row for the same column in the reel table in game storage 282.

To compute the final positions of each of the reels, game result manager 238 identifies a virtual reel, requests and receives a random number from random number generator 232, and uses the random number to identify the location on the virtual reel that should "stop" when the reel stops "spinning". For example, game result manager 238 may take the random number modulo the number of stops per virtual reel to form a reel index.

Random number generator 232 constantly generates random, or in one embodiment, pseudo-random numbers. When requested, random number generator 232 provides the last random number it generated to the requester. In one embodiment, random number generator 232 generates a random number on average every ten milliseconds, although it may not generate random numbers at a fixed frequency. In one embodiment, the random numbers generated by random number generator 232 are between 1 and 9,999,999,999.

In another embodiment, instead of using the random number to identify a reel index directly, game result manager 238 maintains a look-up table in game storage 282 for each virtual reel, with each look-up table containing more entries than there are rows in the reel table in game storage 282. In one embodiment, the look-up tables contains 128 entries each. Each look-up table entry contains a reel index, although several look-up table entries may contain the same reel index. In this look-up table embodiment, game result manager 238 takes the random number and converts it into an index to the look-up table. The index is used to retrieve the reel index from the look-up table. By varying the number of times the reel index appears in the table, each virtual reel stop may be assigned a different probability of being selected.

Game result manager 238 identifies the next virtual reel, requests and receives a random number, uses the random number to compute a table index and uses the table index to identify a reel index, and continues in this manner as described above until game result manager 238 has computed a reel index for each virtual reel. Game result manager 238 sends the computed reel index for each virtual reel to image display manager 252.

Image display manager 252 receives the reel indices while it animates the spinning reels. Image display manager 252 causes the first reel to stop its animation, then the second, and so on until all reels have appeared to stop. Image display manager 252 causes each reel to stop its animation only when the image corresponding to the reel index for that virtual reel is displayed, although a reel will not necessarily stop the first time such an image is displayed.

Image display manager 252 causes the animation to stop with the image corresponding to the reel index for the identified virtual reel being displayed and also displays the adjacent images on the same virtual reel. The adjacent images will correspond to the reel index minus one and the reel index plus one (again with a reel index of zero considered to follow the maximum reel index). For example, the reel index minus one image may be displayed just above the reel index image, and the reel index plus one image may be displayed just below the reel index image. Image display manager 252 sends the reel index for each virtual reel to scoring manager 250.

Scoring manager 250 receives the reel index for each virtual reel, computes the amount won (which may be zero), and adds the amount won to the total credit amount. To compute the amount won, scoring manager 250 extracts the image object pointer from the reel table cell corresponding to the reel index for each virtual reel. Scoring manager 250 keeps the extracted image pointers in a list in order by virtual reel.

Scoring manager 250 scans the scoring table in game storage 282, starting with the first scoring table entry, looking for an entry whose items match the extracted image object pointers. Scoring manager 250 recognizes a match when the first extracted image object pointer matches the first scoring table entry item, the second extracted image object pointer matches the second scoring table entry item, and so on. For purposes of comparison, scoring manager 250 recognizes a wildcard in a scoring table entry item to match any extracted image object pointer.

Scoring manager 250 builds the scoring table each time any new image is incorporated into the game. The scoring table contains one or more rows, with each row containing the image pointers to the images that correspond to a winning combination of images, and an indication of the payout that should occur when the combination is received by scoring manager 250 from image display manager 252.

Scoring manager 250 builds the scoring table from a master scoring table each time a new image is incorporated into the game. A master scoring table is preloaded with entries corresponding to winning combinations of image pointers corresponding to standard images. However, because digital image sets are substituted for the standard images as described above, before any game in which a new substitution occurs, scoring manager 250 copies the master scoring table into the new scoring table, and updates in the new scoring table any image pointers corresponding to those for which a digital image set is substituted for a standard image in every location in the scoring table that the image pointer occurs.

In one embodiment, scoring manager 250 may make multiple payout computations. In such embodiment, scoring manager 250 may extract image object pointers and scan the scoring table for multiple payout lines. As defined herein, a payout line is a set of image object pointers centered around the reel index for each virtual reel such that the images, as displayed at the end of a game, appear in a line, either horizontal or diagonal. For example, when using three reels and letting I1, I2, and I3 represent the reel indexes selected as described above for reels one, two, and three respectively, then (I1, I2, I3) (the primary payout line) falls on a horizontal payout line, as does (I1−1, I2−1, I3−1) and (I1+1, I2+1, I3+1). (I1−1, I2, I3+1) and (I1+1, I2, I3−1) fall on diagonal payout lines. In such embodiment, if the player has wagered the proper number of credits and instructions scoring manager 250 computes the payout for each payout line independently. In one embodiment scoring manager 250 computes an additional payout line for each additional credit wagered, so that scoring manager 250 computes only the (I1, I2, I3) payout line for a one credit wager, but computes all five of the above mentioned payout lines for a five credit wager. Other combination of payout lines may be used for other amounts wagered using any conventional payout/wager techniques.

If scoring manager 250 locates a scoring table entry that matches the received image object pointers (or any related payout line as described above), scoring manager 250 extracts the payout amount from the located scoring table entry and sends the payout amount to account manager 240, multiplied by the credit amounts applied according to the player's instructions, if any. If scoring manager 250 does not locate such a scoring table entry, scoring table sends a payout amount of zero to account manager 240.

In one embodiment, if the payout amount exceeds a certain value, or includes a non-cash award or prize, scoring manager 250 contacts the system administrator in addition to sending the cash portion of the payout amount to account manager 240. In one embodiment, scoring manager 250 contacts the system administrator via communication interface 220, communication interface 332 and user interface manager 330. In one embodiment, scoring manager 250 contacts the system administrator by ringing a bell, operating a flashing light, or other attention-getting device that is part of display 222. In one embodiment, scoring manager 250 attracts attention by extracting a sound file from the image/sound object referred to by the extracted image/sound object pointer, and sends the extracted sound file to audio unit 270 to be played on speaker 271. The sound file that scoring manager 250 extracts and sends to audio unit 270 may be different from the sound file extracted and sent to audio unit 270 by impression counter 288 as described below.

Account manager 240 receives the payout amount, adds the payout amount to the total amount credited to the player's account, and displays the total credit amount, either in dollars and cents or in credits, on display 222 via system user interface 216 as described above.

It is not necessary that the amount credited to a player's account be stored locally within account manager 240. In one embodiment, all account information for a player's account is stored in account database 326, and account manager 240 updates account database 326 when a player's account is credited or debited and retrieves the account information from account database 326 whenever it displays the account status. In such embodiment, the account of the machine (used when players do not identify themselves) may be stored by account manager 240, or the machine may have an account identifier and is treated the same as a player's account. One reason why account database 326 may be used is so that security techniques may be made a part of account database 326 to detect patters or other indicia of fraud.

The player may stop playing and collect all money owed at any time. The money owed may be the money credited to the player in the player's account in account database 326 or part of the account assigned to the machine, used when the player does not identify himself to the system 200. The player indicates an intention to collect money owed by means of system user interface 216, and system user interface signals payment manager 254 with an identifier of the player or the system 200.

In one embodiment, payment manager 254 requests and receives the total credit amount from account manager 240 (which may in turn request it from account database 326), and if greater than zero, provides the amount to payment distributor 260 to allow it to disburse payment. Payment distributor 260 pays the player. In one embodiment, payment distributor 260 emits the payment in coins, chips, or tokens via output slot 259. In one embodiment, either instead of, or in addition to, paying the player as described above, payment manager 254 updates the player's account in account database 326 via communication interface 220. In one embodiment, payment distributor 260 signals the system administrator to provide payment, for example by check, in a similar manner to the way that scoring manager 250 signals the system administrator.

After cashing out, the player may elect to sign off of system 200. To sign off, the player provides identification in a similar manner to the way that the player provided identification as described above, for example by removing a card from ID reader 236 or simply indicating to system user interface 216. ID reader 236 receives the signal via input slot 202 or system user interface 216 receives the signal, and in turn signals payment manager 254 to cash out the player as described above (if the player had not already done so) and signals image set persistence manager 258.

Image set persistence manager 258 receives the signal and in one embodiment removes the player-provided image from image set storage 280 and optionally from image set database 322, or in another embodiment sets a timer (not shown) to signal image set persistence manager 258 at some future time or after a certain amount of time has passed. When the timer signals image set persistence manager 258, image set persistence manager 258 receives the signal and removes the player-provided image from image set storage 280 and optionally from image set database 322.

In one embodiment, system 200 may be managed remotely. In such embodiment, the system administrator may access system 200 via communication interface 220, for example by using Telnet, secure shell, or another such protocol. The system administrator may update or replace the reel table, the standard images, the scoring table, or any combination of these via system user interface 216, and system user interface provides the update to the proper element of system 200. In one embodiment, kiosks 290 may be similarly remotely administered.

In one embodiment, all player activity on system 200 is tracked. In such embodiment, payment manager 254 records payments received from the player, payments paid to the player, game results, and time spent gaming. To record payments, payment manager 254 requests and receives the identifier of the player from ID manager 230, retrieves a system identifier from game storage 282, and builds a payment record consisting of the player identifier, the system identifier, and the amount paid, either positive (for an amount received) or negative (for an amount paid).

Payment manager 254 sends the payment record to tracking database 324. Tracking database 324 is a conventional database, which receives the payment record and stores it. In one embodiment, payment tracking database contains facilities for reporting and/or alerting on player activity, or reporting and/or alerting on system activity, or both.

Similarly, scoring manager 250 builds a scoring record containing the received reel index from each virtual reel, the player identifier from ID manager 230, and the system identifier from game storage 282, and sends the scoring record to tracking database 324.

When the player signs on or off of a system 200, system user interface 216 signals ID manager 230, which requests and receives a timestamp from the timer (not shown). ID manager 230 builds a session record containing the player identifier, the system identifier from game storage 282, the sign-on timestamp or the sign-off timestamp, and sends the session record to tracking database 324 via communication interface 220 whenever a player signs on or off a machine.

In one embodiment, after a player finishes playing a game, instead of deleting the player's digital image sets from shared resources 350, the player's digital image sets remain in image set database 322 and if the player permits, can be used by different players in their games to earn points for the player that supplied the digital image set. When a different player plays the game, one or more digital image sets submitted by other players, who are now non-playing participants, is selected and is substituted or incorporated into a standard image used in the game and those other players earn points towards prizes or drawings for allowing the use of their digital image sets. In one embodiment, the player also is credited an equal number of points as the other players for the use of his or her digital image set in the game. If the new player wins a prize on a line in which the non-playing participant's image appears, that non-playing participant may win something as well, although in one embodiment, the non-playing participant does not win cash, but additional points redeemable for prizes or entries in a drawing. The points awarded to these non-playing participants correspond to the winnings of the player playing the game: the more the player playing the game wins in cash prizes, the more points the non-playing participant whose image set appears in a winning line wins. This way, the non-playing participant has a stake in the games the non-playing participant is not playing.

There may be more than one non-playing participant winner. For example, non-playing participants image sets may be used on multiple reels, allowing multiple non-playing participants to win credit awards each time a player wins a prize, which as noted above, has a greater than nominal value.

As described above, each system 200 may have its own image set database 322 and in another embodiment, several systems 200 may be coupled to a single image set database 322 and various player-provided digital image sets may be shared among the several systems 200 for use as non-playing participant digital images.

As described above, player-provided digital image sets are stored in image records in image set database 322. Each digital image set record contains a digital image set and the player identifier of the player that contributed the digital image set, and an indication as to whether the digital image set needs approval, was approved or was not approved.

In one embodiment, at any time either before or after the first game in which a digital image set is used, image set persistence manager 258 asks (via system user interface 216) the player that supplied the digital image set for permission to allow other players to reference the player-provided image in image set database 322. In such embodiment, if the player grants permission, image set persistence manager 258 marks the digital image set record in image set database 322 as "public". In another embodiment, all image records are marked as public unless the player identifies them as not public. Image records marked as public are then available for use in games played by persons other than the player who provided them or the player displayed in them, as will now be described.

In one embodiment, before the start of each game, or in another embodiment, when a new image set is retrieved for the player as described above, image set manager 218 retrieves into image set storage 280 one or more digital image sets from image set database 322 supplied by one or more players of other systems 200 or prior players of the system 200 as described above, such other players being referred to as "non-playing participants".

In one embodiment, each game uses a certain number of digital image sets of non-playing participants and image set manager 218 retrieves that many non-playing participant images from image set database 322. In another embodiment, each game incorporates a randomly chosen number of digital image sets from non-playing participants, and image set manager 218 requests the random number from random number generator, and then mathematically converts the random number to a number between a minimum and a maximum. Image set manager 218 randomly selects and retrieves into image set storage 280 that many digital image sets from image set database 322 in such a manner that no more than one digital image set per non-playing participant is retrieved for use in any one game and the digital image set does not correspond to the player's identifier, such digital image set having been optionally retrieved as described above.

In one embodiment, if the player's digital image set and non-playing participant's digital image sets are used in a game, because digital image sets from non-playing participants are randomly selected from a pool which can grow to be larger than the number of digital image sets used in any one game, the probability that any one non playing participant's image gets used in a single game is much lower than the certainty that the player's digital image set will be used.

In this embodiment, instead of retrieving the digital image set for non-playing participants alone as described above, image set manager 218 retrieves and stores into an image object in image set storage 280 the player identifier in addition to the digital image set from the digital image set record for each non-playing participant to allow it to award points to non-playing participants.

In one embodiment, image set manager 218 substitutes the non-playing participant images retrieved as described above for at least a portion of, or otherwise incorporates the non-playing participant images into, different of the standard images on any of the reels, except that image set manager 218 does not replace at least a portion of, or otherwise incorporate, the standard image already used for replacement or incorporation of the player's digital image set, if any. In one embodiment, the same standard image used for replacement or incorporation for the player's digital image set is used for replacement or incorporation of the non-playing participants, except that a different reel other than the reel used for the player's digital image set, is used for the non-playing participants. In another embodiment, standard images used for the digital image sets of non-playing participants are a full reel. Other embodiments use other sets of standard images for substitution at least in part or incorporation, using the non-playing participant's digital image sets.

In one embodiment, after image set manager 218 performs the substitution or incorporation, image set manager builds an icon and adds it to the image object stored in image set storage 280 to be used in the scoring key as described above.

Because it can take time to download the non-participant player images, perform the substitution or incorporation and build the icon, in one embodiment, all of these activities for one game may be performed during the play of a prior game. In such embodiment, image set storage 280 is logically divided into two areas. One area is designated as the current area for use by the current game, and another area is designated as a staging area to use for the next game. When a new game is played, the designations of the two areas are switched: the prior staging area is used as the current area and vice versa. This allows a new group of digital image sets to be made ready more quickly than would be possible if all of these activities are performed at the start of each game.

Image set manager 218 updates the scoring table to include pointers to the image objects corresponding to non-playing participants in the same manner as it adjusted the scoring table for the image object of the player as described above, and signals system user interface 216 to display the scoring table as described above. System user interface 216 uses the image icon from image set storage 280 when formatting the scoring table for display on scoring key display 268.

The player operates system 200 as described above, images are displayed by image display manager 252 as described above, and game result manager 238 sends the reel index for each virtual reel to scoring manager 250 as described above and scoring manager 250 identifies the payout as described above.

If scoring manager 250 locates a scoring table entry for a payout, and the entry corresponds to the digital image object pointers corresponding to non-playing participant digital image object scoring manager 250 extracts the non-playing participant player identifiers, if any, from the associated image objects.

In one embodiment, each scoring table entry contains a non-playing participant payout point value, which is a point value awarded to any non-playing participant whose player-provided image appears in the associated winning combination of images. A non-playing participant whose digital image set appears in a winning combination is herein referred to as a non playing participant winner. In another embodiment, scoring manager 250 computes non-playing participant payout amounts from the payout amount in the scoring table entry, for example, as a fraction of the payout amount or a number of points equal to the payout amount.

Scoring manager 250 updates account database 326 with by adding the point value computed as described above to the record for each non-playing participant winner.

In one embodiment, instead of, or in addition to, providing points only to non-playing participants whose images are used to win a game, in one embodiment, scoring manager 250 updates account database with a minimum number of points for all players whose digital image sets were downloaded for use in the game as described above, regardless of whether those digital image sets were ever displayed at or near the winning images or part of a winning combination of images. In one embodiment, the player may also win points for having his digital image set displayed or using his or digital image set in the game, in the same amount as a non-playing participant or in a different amount.

It isn't necessary that non-cash points be used for non-playing participants. In one embodiment, credit awards are awarded to non-playing participants, and such credit awards may be cash awards that are redeemable for service or merchandise at a higher rate than the cash value. For example, a player who wins $5.00 as a non-playing participant may apply the $5.00 as a $25.00 credit towards a hotel room.

Periodically, for example once per day, database reaper 340 scans the image records in image set database 322, and deletes image records that have not been referenced recently, for example within six months. To scan the image records in image set database 322, database reaper 340 selects the first digital image set record from image set database 322, and extracts the player identifier from the selected digital image set record. Database reaper 340 uses the extracted player identifier to request and receive the most recent sign-on timestamp of the associated player from tracking database 324.

Database reaper 340 subtracts the received sign-on timestamp from a current timestamp that database reaper 340 requests and receives from a timer (not shown), and compares this time difference to an image time limit stored internally within database reaper 340. If the time difference exceeds the image time limit, then database reaper 340 sends a command to image set database 322 to delete all image records for that player, which receives the command and deletes the image records.

In one embodiment, before deleting image records for a player, database reaper 358 also requests and receives from tracking database 324 an amount of money wagered during one or more periods, such as one year prior to the current date. If the amount of money wagered exceeds one or more thresholds, database reaper 358 does not initiate the deletion of image records for that player as described above. In one embodiment, a system administrator may mark the player's account in account database to prevent any deletion of the image records for a player, and database reaper 358 checks for the mark before deleting a digital image set record: if the account is so marked, the image records for that player are not deleted.

Database reaper 358 selects the next digital image set record and continues as described above until database reaper 340 has deleted all image records from image set database 322 as described above.

In one embodiment, a other parties may supply digital image sets to be displayed in the game, either directly, or via an agent such as an advertising agency. These digital image sets may include the name, logo or other indicia of a party or a product or service and the digital image set is considered an advertisement. The digital image set may be part of a promotion such that any or all of the player and the non-playing participants whose images may also be used for display in the game are entered into a promotion corresponding to the digital image set supplied by the other party. For example, a car company may supply a digital image set of an automobile and the player or non-playing participants whose images are used in the game or used to win the game are entered into a contest for that car, or earn points corresponding to a chance at that car or discounts to be applied to that car or to any other car available from that car company. There may be multiple such image sets used in any one game from one or more advertisers, and the player or non-playing participants may earn a certain set of points for an advertiser or a promotion of the advertiser merely because the digital image sets of an advertiser are downloaded for use in the game, whether those images are used to win the game, and/or may receive another number of points if the digital image sets of an advertiser or promotion of the advertiser are used to win a prize in the game. In one embodiment, if a digital image set is visible, even if not used to win a prize, but for example, is displayed directly below the image used to win a prize, or the reel stops with no image on any line because the reel stopped one-half stop off the line, the player, and some or all of the non-playing participants earn some number of points in that promotion, but points are not earned for digital image sets that are not clearly seen by the player. In one embodiment, the advertiser may supply an audio component of the advertisement, which may be played to the player either during or after the game. The audio component could include a jingle of the advertiser, for example.

In one embodiment, an account is set up for each advertiser in a manner similar to that used for a player, although the system administrator uses user interface manager 330 to indicate that the account is the account of an advertiser. The advertiser may supply a digital image set in any of the manners described above that were used for the receipt of a digital image set from a player, and approval manager 320 receives the digital image set. In one embodiment, a digital image set may include not only one or more digital images, but also one or more audio files, such as a digital audio file.

Approval manager 320 displays the image and plays the sound file for approval by a system administrator using a conventional user interface contained within approval manager 320, and a conventional display screen, audio unit, and speakers. Once the system administrator has approved the image/sound object, approval manager 320 marks the digital image set as approved as described above.

It isn't necessary that the digital image sets received from advertisers be received and stored using the same mechanisms used to receive and store the digital image sets received from players, and so they may be separately received and stored in other embodiments. Because it can simplify the description, as described herein, advertiser's digital image sets are stored in image set database 322 like those of players. In such embodiment, to retrieve non-playing participant digital image sets for inclusion in a game as described above, only digital image sets not corresponding to accounts identified as advertisers (and not corresponding to the player) are retrieved from image set database 322 in order to display digital image sets from non-playing participants in the game as described above. Digital image sets corresponding to promotions are separately retrieved as described below.

In one embodiment, the advertiser may wish to associate a particular promotion with the supplied image and sound file(s) making up the digital image set. In such embodiment, the system administrator may add to the digital image set record in image set database an identifier of the promotion. For example, if the advertiser were Ford Motor Company, then the image may be of a Ford Mustang, a sound file may be an advertising jingle, and the prize may be a new Mustang or a chance in a drawing to win a new Mustang. Ford may also submit digital image sets illustrating a Ford Explorer, for use with a different promotion, also run by Ford, to win a new Ford Explorer. User interface manager 330 allows the system administrator to add a promotion code and description to the digital image set record for any image in image set database 322 for use as described below.

It is also possible to have several digital image sets contain the same promotion code and description. For example, if the promotion is a chance to win a Ford automobile, there may be several images of different Ford automobiles, but each applies to the same promotion and the system administrator would therefore enter the same promotion code in the digital image set record in image set database 288 for all digital image sets to be used in the promotion.

When a game is played, in addition to, or instead of, retrieving the digital image set of the player and optionally, non-playing participants, image set manager 218 identifies a number of digital image sets of advertisers to retrieve in any of the manners described above used to determine the number of digital image sets of non-playing participants to retrieve. Image set manager 218 then retrieves from image set database 322 that many image sets corresponding to accounts identified as advertisers. The account identifier, promotion code and promotion description from each digital image set record from which a digital image set was retrieved may also be retrieved from image set database 322 and stored with each image object containing each such digital image set in image storage 280.

In one embodiment, image set manager 218 retrieves such advertiser-supplied image sets at random. In another embodiment, image set manager 218 uses fulfillment calculator 342, described below, to identify digital image sets for which commitments as to the number of impressions to be made in a given period have been made, but for which the rate of impressions is falling behind the rate required to meet the commitments for the period. Image set manager 218 retrieves such images first, then selects any others required to meet the number of digital image sets it requires using another method, such as at random.

Image set manager 218 then substitutes at least a part of the standard image or incorporates the digital image set from the advertiser into some of the standard images in the game in the same manner as has been described above. The standard images used may involve all of the images on one reel, or certain winning combinations of images or any other standard images, such as a random selection. Image set manager 218 also builds the icon that system user interface 216 uses to display the scoring key in a scoring key area of display 222.

In one embodiment, the standard images selected for substitution by, or incorporation with, player and non-playing participant digital image sets, are different from those selected for substitution by, or incorporation with, advertiser-supplied digital image sets. In another embodiment, advertiser supplied digital image sets are incorporated with the already substituted or incorporated digital image sets of players or non-playing participants, so that, for example, a player may be shown driving a new Ford automobile.

Image set manager 218 updates the scoring table in game storage 282 as described above, and also updates the payout amount with the promotion identifier and description for each digital image set used in the game. The promotion description may be displayed by system user interface 216 as part of the key it displays to inform the player of the award amounts.

The player identifies the wager and starts the game, which is played as described above, the result is identified, and digital image sets corresponding to the result are displayed by image display manager 252. If the game allows, other digital image sets may also be displayed, such as the digital image sets adjacent to a digital image set displayed on a payout line, may also be displayed by image display manager 252.

When game result manager 238 identifies the result of the game, game result manager 238 also sends the reel index corresponding to payout lines to impression counter 288 and audio unit 270.

Audio unit 270 examines the object referred to by each image object pointer it receives and determines if the object has a promotion code, and if so, whether the image object contains an audio file. If so, audio unit 270 extracts the sound file from the image set object and plays the audio file via speaker 271. In one embodiment, audio unit 270 removes duplicates so that the sound file is played only once, even if audio unit 270 receives duplicate copies of the image set pointer.

Impression counter 288 receives the reel indexes, and for each virtual reel, extracts the image set object pointer from the reel table cell corresponding to the reel index for that virtual reel. Impression counter 288 identifies the promotion codes and account numbers in the image objects corresponding to the pointers it receives, removes duplicates, and adds a new record containing this information and the player identifier to tracking database 324 via communication interface 220. In one embodiment, game result manager 238 provides to impression counter 288 image object pointers corresponding to any digital image set displayed, even if it does not correspond to a payout. Impression counter 288 may also provide to audio unit 270 all such pointers, and audio unit 270 plays the audio files one at a time. In one embodiment, audio unit will play only a limited number of audio files or a maximum duration of audio files, preferring those on payout lines, and playing other audio files if the number or duration of audio files on payout lines is below a limit. The impression counts in tracking database 324 serve two purposes: they allow points to be tallied for the player and they allow impressions (i.e. counts of the viewings of advertisements) to be counted and reported to the advertiser.

Although a slot machine has no intermediate steps in the game, other games such as some card games use intermediate steps. In such embodiment, game result manager 238 provides to impression counter 288 pointers to the image objects at each step and at the conclusion of the game, and provides an indication of whether the impressions are being generated at an intermediate step or the conclusion of the game. Impression counter stores the same information at each step as described above for the conclusion of the game, and also stores whether the step is an intermediate step or the conclusion, in tracking database 324.

The term promotion is used herein, but there need not be a prize associated with any particular promotion. Thus, the advertiser supplied images may be purely advertising. In the event that a prize is associated with the promotion, although the prize is selected as described herein after the promotion ends from all those who received points for that promotion, the images may be supplied in such a manner that a certain combination of images displayed on a payout line will cause the player to win the promotion instantly, in other embodiments.

In one embodiment, the advertiser pays for impressions, which is a display of an advertisement. The party to whom the advertiser pays may be the operator of the system 200 on which the impressions are made, the operator of the shared resources 350 into which the digital image set containing the advertisement is stored, the entity operating of the property on which the system is used, any or all of these or any other entity. In such embodiment, fulfillment calculator 342 tracks the number of impressions for each promotion to ensure that the advertiser obtains the number of impressions for which the advertiser has been paid.

There are many ways of tracking impressions and the present invention can accommodate any of these and any others. In one embodiment, the advertiser pays for a minimum number of impressions, however long it takes for them to occur. In another embodiment, an advertiser pays to have the impressions made for a certain period of time. In another embodiment, the advertiser pays to have the impressions made during a period of time, but is guaranteed a minimum number of impressions over that period, and if the minimum number of impressions is not made, the advertiser receives a number of impressions equal to the deficit, multiplied by a penalty multiplier greater than or equal to 1.

Fulfillment calculator 342 tracks the number of times that impressions for a promotion have been made, marks the image/sound object as unavailable when a viewing threshold has been reached or exceeded, and optionally bills the advertiser based on the number of impressions or provides reports to the advertiser to show that the commitments agreed to have been made.

In one embodiment, the type of commitment and the parameters of the commitments (e.g. start and stop dates, minimums, penalty multipliers, charge per impression, etc.) are provided in a promotions table in tracking database 324 by a system administrator using user interface manager 330 for use as described below.

Periodically, fulfillment calculator 342 retrieves the parameters for each promotion in the promotions table in tracking database 324 that has not been concluded and identifies whether any commitments have been fulfilled or whether any charges should be assessed. For each promotion that runs during a set period with no minimum, fulfillment calculator 342 identifies if the period has ended. If so, fulfillment calculator 342 marks the record in the promotions table in tracking database 324 as having been concluded and marks the digital image sets having the promotion code and player identifier corresponding to the record in the promotions table as not approved, so that the digital image sets for that promotion will no longer be selected for use in a game as described above.

For each other promotion that is marked as not having been concluded, fulfillment calculator 342 constructs a query regarding the number of impressions for the promotion, and sends the query to tracking database 324.

If the charge is incurred after the commitment for the promotion has been fulfilled, if the commitments for the promotion has been fulfilled, fulfillment calculator 342 sends an invoice to the advertiser via a printer (not shown) coupled to a network coupled to communication interface 332, and otherwise, may print a report showing the number of impressions for that promotion that have been made. If the charge is incurred in advance, fulfillment calculator 342 sends a report showing progress made or indicates that the commitments have been fulfilled. If the commitment requires additional impressions to be provided using the penalty multiplier, fulfillment calculator 342 so indicates on the report it provides as described above, and identifies the total number of impressions now required to fulfill the commitment in addition to showing the number of impressions made thus far.

For any such promotion for which a commitment has been fulfilled, fulfillment calculator 342 marks the record in the promotion table as having been fulfilled and marks the digital image sets in image set database 322 as having been disapproved as described above.

In one embodiment, fulfillment calculator 342 periodically queries tracking database 324 for all points for all promotions for which points have been accumulated by a player. In one embodiment, the promotion record in the promotion table contains instructions of how the points are to be applied and fulfillment calculator 342 uses these instructions to calculate the number of points recorded. For example, an impression at an intermediate step in a game may count for one point towards that promotion and an impression at the end of the game may count towards two points toward that promotion.

Fulfillment calculator 342 builds and sends to a printer or an email address in the player's account record, a report for the player as described above with the number of points earned for each promotion, the description of the promotion and redeeming instructions, a coupon or a similar item, if applicable, for each such promotion for which requirements for such coupon (stored in the promotions table) have been fulfilled, the report to be mailed to the player's home or other contact address or emailed. The report may include other promotional messages, such as from a casino in which the player played at least one system 200.

In one embodiment, if the points correspond to a chance in a drawing, fulfillment calculator 342 selects the winner or winners of the drawings by assigning one number to each record in tracking database 324 for every point earned in the promotion (e.g. records with two points are assigned two numbers), then generating a random number, and identifying the player corresponding to the record in tracking database 324 having the identifier of the promotion that also has a number assigned that corresponds to the random number selected. Fulfillment calculator 342 generates a report to the printer to be mailed to the player's home or other contact address, such as an e-mail address announcing the winner. The report sent to the advertiser may also contain the name and address of the winner.

Figure 4:
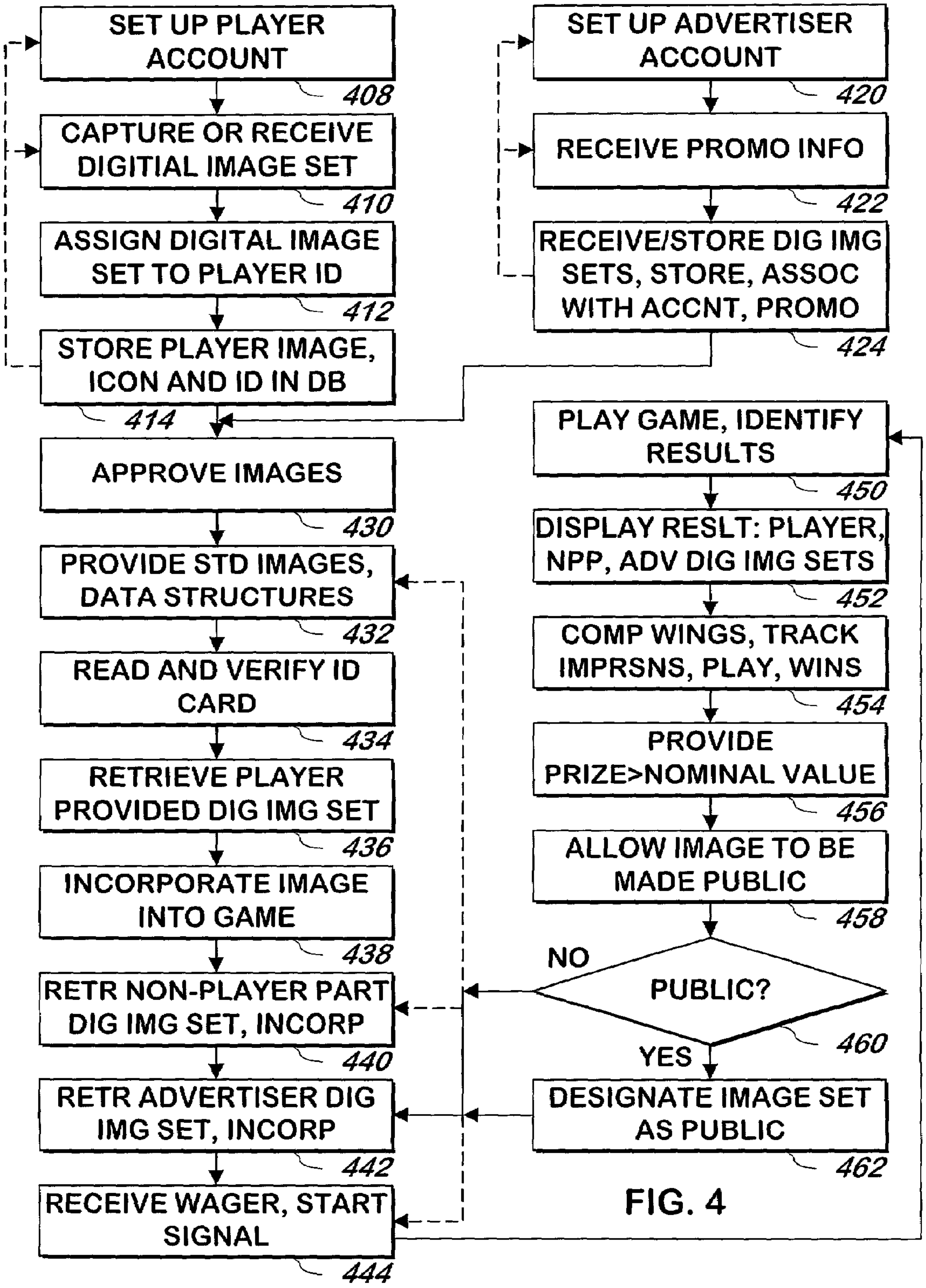
FIG. 4 is a flowchart illustrating a method of a method of playing a game for which a prize of greater than nominal value is paid according to one embodiment of the present invention.

Referring now to FIG. 4, a flowchart illustrating a method of playing a game for which a prize of greater than nominal value is paid is shown according to one embodiment of the present invention. An account is set up for a player as described above 408. A player-provided digital image set is captured or received 410, and the digital image set is assigned to a player identifier 412 as described above. Steps 410 or 412 may include identifying the player, and may be performed at or near a gaming device or at a kiosk as described above. The player-provided image, an image icon, and the player's identification is stored, for example, in a database 414. Steps 410–414 or 408–414 may be performed as part of an independently running process as illustrated by the dashed line in the Figure. This allows multiple accounts to be set up and any number of images per account to be received as described above.

An advertiser account is set up 420 as described above. A promotion is defined as described above 422 and one or more digital image sets may be received and stored into a database, associated with the promotion and the advertiser account as described above 424. Steps 420–424 or 422–424 may be part of an independently running process as shown by the dashed line in the Figure and step 424 may be repeated any number of times for a single promotion, if desired.

Digital image sets received from a player or advertisers or both are approved 430 as described above. Standard images and a scoring table and other data structures for a game are provided 432, and the player's identity is optionally determined, for example, by reading an identification card or other means of identification and if the player identification is received, the player's identity is verified 434 as described above.

An approved digital image set provided by the player, if any, is retrieved 436 as described above. The player-provided image is incorporated 438 into the game as described above. Approved digital image sets from non-playing participants may be optionally retrieved and incorporated into the game 440 as described above. Approved digital image sets from advertisers may be retrieved and incorporated 442 into the game as described above. Incorporating a digital image set may involve substituting a digital image set for at least a portion of, or otherwise incorporating the digital image set into, a standard image, adjusting a scoring table, building an icon and performing other steps described above.

A wager is received from the player and either wager instructions are determined by the payment or explicitly identified by the player, and a start signal is received 444 as described above.

The game is played and results identified 450 as described above. Playing the game may involve one or more steps intermediate between the start and end of the game, such as moves in a card game, or may involve no intermediate steps, such as playing a slot machine, and step 450 may involve displaying some or all of one or more digital image sets provided by any or all of the player, non-playing participants, and advertisers. The results are displayed and digital image sets provided by any or all of the player, non-playing participants, and advertisers are displayed 452 as described above. The display some or all of a digital image set may include playing an associated audio file as described above. Winnings are computed and the winnings, impressions, wagers, play time, and other data related to the player are logged 454 as described above. A prize having a value larger than a nominal value may be paid 456 to the player, either by dispensing cash or crediting a player's account.

The player is allowed to designate the digital image set the player supplied as public 458 and if the player so designates 460, the digital image set supplied may be designated for use 462 as a digital image set of a non-playing participant when another player plays a game, either the same type of game or a different type of game, as described above. Otherwise 460, or following step 462 the method continues at step 442 in one embodiment, 444, 440 or 432 in other embodiments.

Figure 5A:
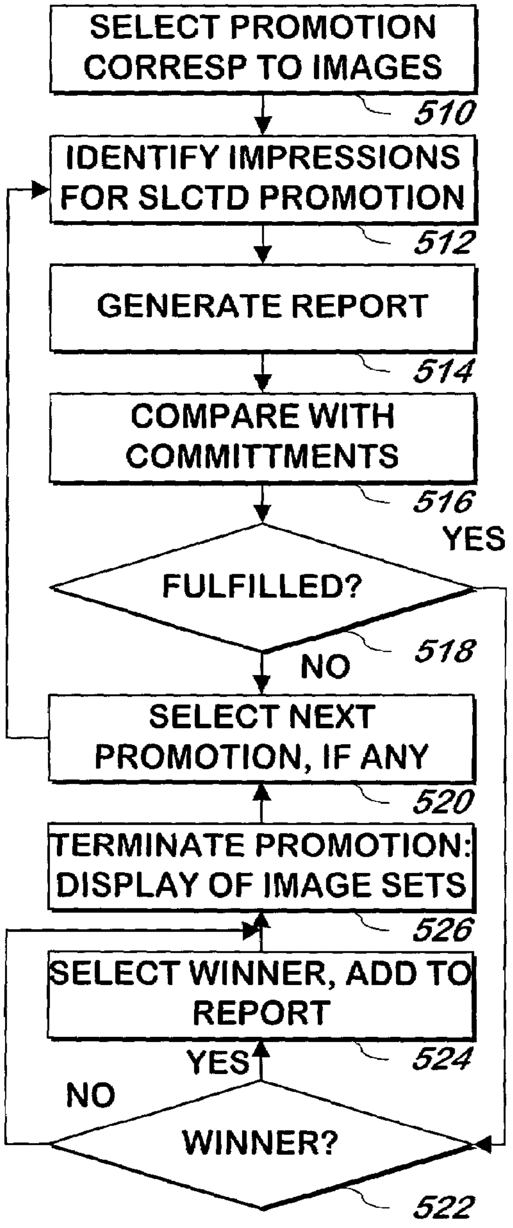
FIG. 5A is a flowchart illustrating a method of managing promotions according to one embodiment of the present invention.

Referring now to FIG. 5A, a flowchart illustrating a method of managing promotions is shown according to one embodiment of the present invention. A promotion for which one or more digital image sets were displayed in a game for which money was wagered and a prize of greater than nominal value is paid is selected 510 as described above. The number of impressions corresponding to the promotion is identified 512 and a report of the impressions is generated 514 as described above. The number of impressions, the date, or other information is compared with commitments made for the promotion 516 and if the commitments are fulfilled 518, the method continues at step 522, and otherwise 518, another promotion is selected, if any 520 and the method continues at step 512 using the selected promotion.

At step 522, if the promotion has a winner, the winner of the promotion is selected 524 from those who viewed impressions related to the promotion while playing the game for which money was wagered for a prize of greater than nominal value, and the winner is identified 526 in the report and the account of the winner is marked. The promotion is terminated 528, such as by marking the digital image sets used in the promotion as not approved or removing them, and the method continues at step 520.

Figure 5B:
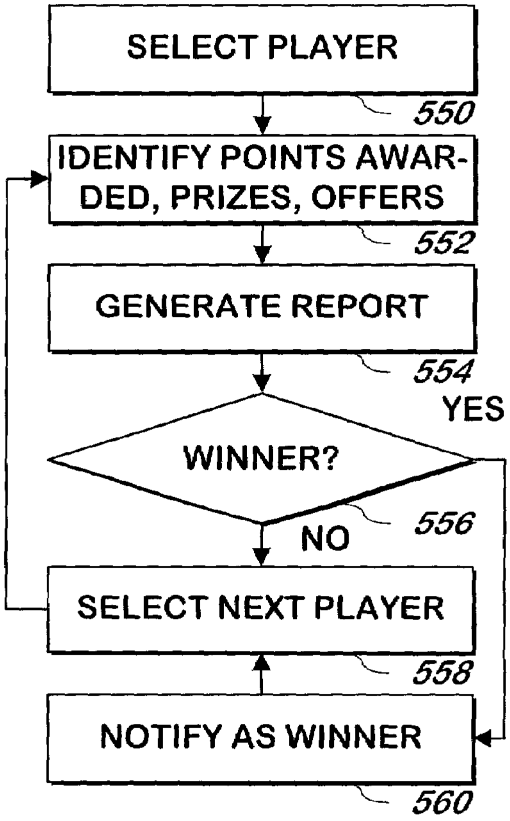
FIG. 5B is a flowchart illustrating a method of providing reports to players according to one embodiment of the present invention.

Referring now to FIG. 5B a flowchart illustrating a method of providing reports to players is shown according to one embodiment of the present invention. A player is selected 550. Points awarded, prizes the selected player may have won, and offers applicable to the selected player are identified 552 and a report is generated 554 to be mailed or e-mailed or otherwise delivered to the player. If the player was identified as a winner of a promotion, the player may be notified 560 and the next player is selected 558 and the method continues at step 552 using that player. If the player is not a winner 556, the method continues at step 558.

What is claimed is:

1. A method of playing a game with a player, the method comprising:

receiving at least one selected from a first group comprising:

a digital image set provided by a player; and a digital image set comprising an image of the player;

displaying, in a game of chance, at least a portion of at least one of the at least one digital image set received;

receiving at least one selected from a second group comprising:

an additional digital image set provided by a person other than the player who does not play the game; and an additional digital image set comprising an image of the person other than the player;

displaying, as part of the game, at least a portion of the at least one additional digital image set received;

providing a prize having a value greater than a nominal value responsive to the game of chance; and providing a prize to the person other than the player responsive to the at least one additional digital image set being related to an outcome of the game.

2. The method of claim 1 wherein the game comprises a slot machine.

3. The method of claim 1 wherein the game comprises a card game.

4. The method of claim 1 additionally comprising approving the digital image set.

5. The method of claim 1:

additionally comprising receiving an indication of an amount wagered; and wherein the providing the prize step is responsive to the amount wagered.

6. The method of claim 1 wherein the additional digital image set is related to the outcome of the game if the at least the portion of the additional digital image set is displayed as a winning outcome of the game.

7. The method of claim 1 wherein the digital image set comprises at least one photographic image.

8. The method of claim 1, additionally comprising storing the digital image set on a device coupled to a set of a plurality of machines, each capable of employing the digital image set in a game of chance for which a prize having greater than a nominal value is played.

9. A system for playing a game with a player, the system comprising:

an image set manager having an input for receiving at least one selected from a first group comprising:

a digital image set provided by a player; and a digital image set comprising an image of the player;

and at least one selected from a second group comprising:

an additional digital image set provided by a person other than the player who does not play the game; and an additional digital image set comprising an image of the person other than the player;

the image set manager for providing the at least one digital image set and the at least one additional image set received at the image set manager input at an output;

a game result manager for identifying a result of a game of chance and providing an indication of the result at an output in response to a signal from the player received at an input;

an image display manager having a first input coupled to the image set manager output for receiving the at least one digital image set and at least a portion of the at least one additional digital image set, and a second input coupled to the game result manager output for receiving the indication of the result, the image display manager for displaying, at least one image responsive to the result received at the second image display manager input and comprising at least a portion of at least one of the at least one digital image set received at the first image display manager input, and for displaying at least one additional image responsive to the result received at the second image display manager input and comprising at least a portion of at least one of the at least one additional digital image set received at the first image display manager input;

a payout manager having an input coupled to the game result manager output for receiving the indication, the payout manager for provding at an output a prize having a value greater than a nominal value responsive to the indication received at the payout manager input, and for providing at the output a prize to the person other than the player, responsive to the at least one additional digital image set being related to the result having the indication received at the payout manager input.

10. The system of claim 9 wherein the game comprises a slot machine.

11. The system of claim 9 wherein the game comprises a card game.

12. The system of claim 9 additionally comprising an approval manager having an input for receiving the at least one selected from the digital image set provided by a player; and the digital image set comprising an image of the player, the approval manager for displaying the digital image set to a party other than the player, and, responsive to an approval signal received at an input providing the at least one digital image set to the image set manager input.

13. The system of claim 9:

additionally comprising a payment receiver for receiving at an input an amount wagered and providing at an output an indication of the amount wagered; and wherein:

the payout manager additionally has a second input coupled to the payment receiver input for receiving the indication of the amount wagered; and the payout manager provides the prize responsive to the indication of amount wagered received at the payout manager second input.

14. The system of claim 9 wherein the digital image set comprises at least one photographic image.

15. A computer program product comprising a computer useable medium having computer readable program code embodied therein for playing a game with a player, the computer program product comprising computer readable program code devices configured to cause a computer to:

receive at least one selected from a first group comprising:

a digital image set provided by a player; and a digital image set comprising an image of the player;

display, in a game of chance, at least a portion of at least one of the at least one digital image set received;

receive at least one selected from a second group comprising:

an additional digital image set provided by a person other than the player who does not play the game; and an additional digital image set comprising an image of the person other than the player;

display, as part of the game, at least a portion of the at least one additional digital image set received;

provide a prize having a value greater than a nominal value responsive to the game of chance; and provide a prize to the person other than the player responsive to the at least one additional digital image set being related to an outcome of the game.

16. The computer program product of claim 15 wherein the game comprises a slot machine.

17. The computer program product of claim 15 wherein the game comprises a card game.

18. The computer program product of claim 15 additionally comprising computer readable program code devices configured to cause a computer to approve the digital image set.

19. The computer program product of claim 15:

additionally comprising computer readable program code devices configured to cause a computer to receive an indication of an amount wagered; and wherein the providing the prize step is responsive to the amount wagered.

20. The computer program product of claim 15 wherein the additional digital image set is related to the outcome of the game if the at least the portion of the additional digital image set is displayed as a winning outcome of the game.

21. The computer program product of claim 15 wherein the digital image set comprises at least one photographic image.

* * * * *